United States Patent
Hussain et al.

(10) Patent No.: US 6,366,781 B1
(45) Date of Patent: Apr. 2, 2002

(54) SYSTEM AND METHOD FOR TIME OF ARRIVAL BASED POSITIONING DURING HANDOVER

(75) Inventors: Tahir Hussain; Bagher Zadeh, both of Dallas, TX (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/350,042

(22) Filed: Jul. 8, 1999

(51) Int. Cl.[7] ................................................. H04Q 7/20
(52) U.S. Cl. ........................................ 455/456; 455/436
(58) Field of Search ................................ 455/422, 432, 455/436, 456, 560; 342/357.01, 357.17, 457

(56) References Cited

U.S. PATENT DOCUMENTS

| | | | |
|---|---|---|---|
| 5,903,844 A | 5/1999 | Bruckert et al. | 455/456 |
| 6,185,428 B1 * | 2/2001 | Kingdon et al. | 455/456 |
| 6,285,884 B1 * | 9/2001 | Vaara | 455/436 |
| 6,311,069 B1 * | 10/2001 | Havinis et al. | 455/456 |
| 6,317,604 B1 * | 11/2001 | Kovach, Jr. et al. | 455/456 |

FOREIGN PATENT DOCUMENTS

| | | |
|---|---|---|
| WO | WO 98/15150 | 4/1998 |
| WO | WO 00/30397 | 5/2000 |

OTHER PUBLICATIONS

PCT International Search Report dated Oct. 17, 2000.

* cited by examiner

*Primary Examiner*—Nay Maung
(74) *Attorney, Agent, or Firm*—Jenkens & Gilchrist, P.C.

(57) ABSTRACT

A telecommunications system and method is disclosed for allowing an ongoing Time of Arrival (TOA) based positioning of a mobile station to proceed if a radio related handover has occurred before the expiration of a delta timer in a Base Station Controller (BSC). The BSC stores an HOTIMER value therein, which corresponds to the amount of time involved in a normal radio-related handover procedure from the sending of a Handover Command to the reception of a Handover Complete message. If the BSC delta timer is active, e.g., positioning is ongoing, and the BSC determines that a radio related handover is needed, the BSC checks the amount of time remaining in the BSC delta timer. If that amount is more than the HOTIMER, then the ongoing positioning is not canceled.

16 Claims, 6 Drawing Sheets

SYSTEM AND METHOD FOR TIME OF ARRIVAL BASED POSITIONING DURING HANDOVER

BACKGROUND OF THE PRESENT INVENTION

1. Field of the Invention

The present invention relates generally to telecommunications systems and methods for positioning a mobile station within a cellular network, and specifically to positioning a mobile station during a handover.

2. Background of the Present Invention

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

Figure 1:
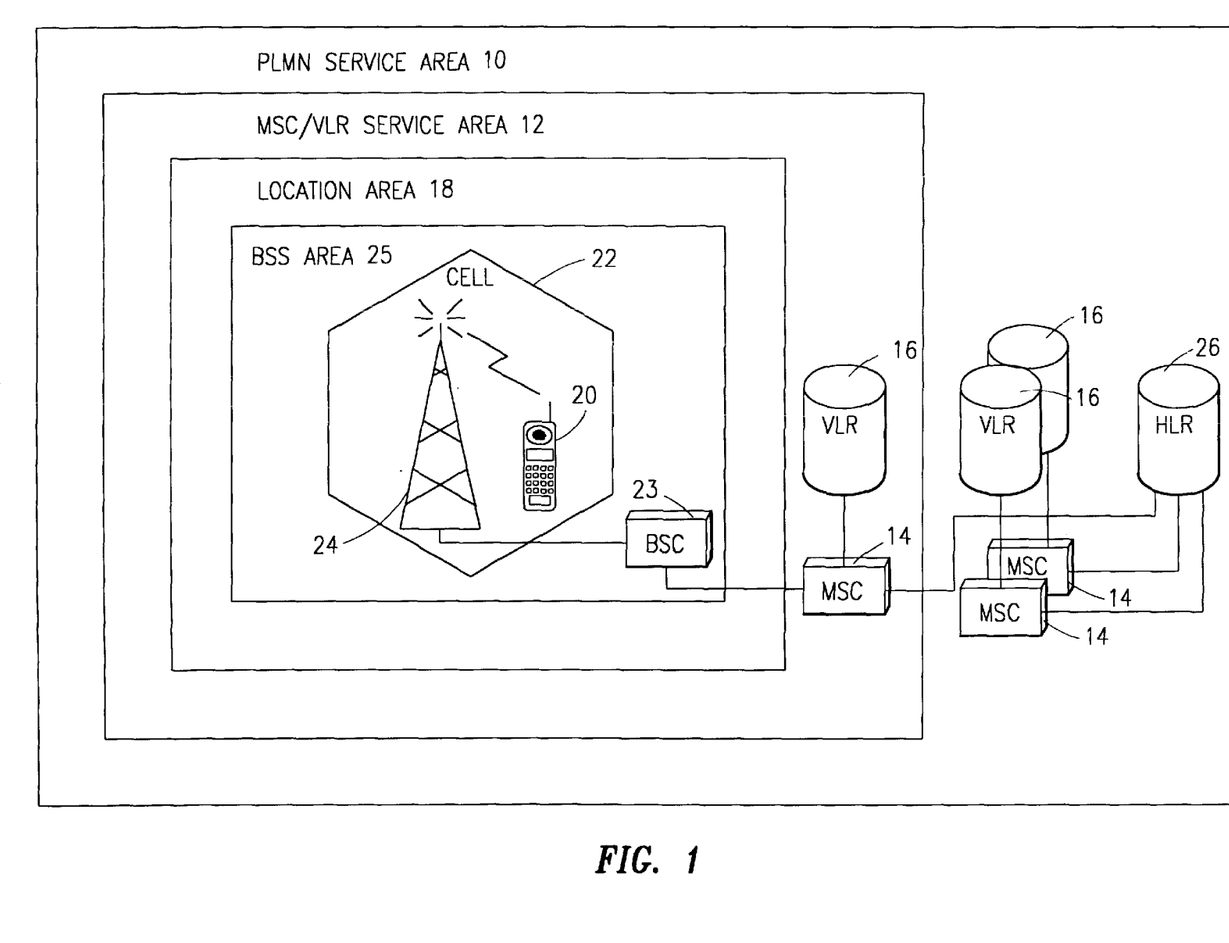
FIG. 1 is a block diagram of a conventional cellular network.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC 14 that controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

The MS 20 and the BTS 24 communicate over a radio interface, which utilizes the Time Division Multiple Access (TDMA) concept, with one TDMA frame per carrier frequency. The TDMA frames are numbered in a cyclic pattern. Each TDMA frame consists of a number of time slots, in which each time slot is referred to as a physical channel. Depending upon the type of information being transmitted, different types of logical channels are mapped onto these physical channels. For example, to transmit speech, the logical channel "traffic channel" must be mapped onto one of the physical channels. The information sent on one of these channels is called a burst.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the MS 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

Figure 2A:
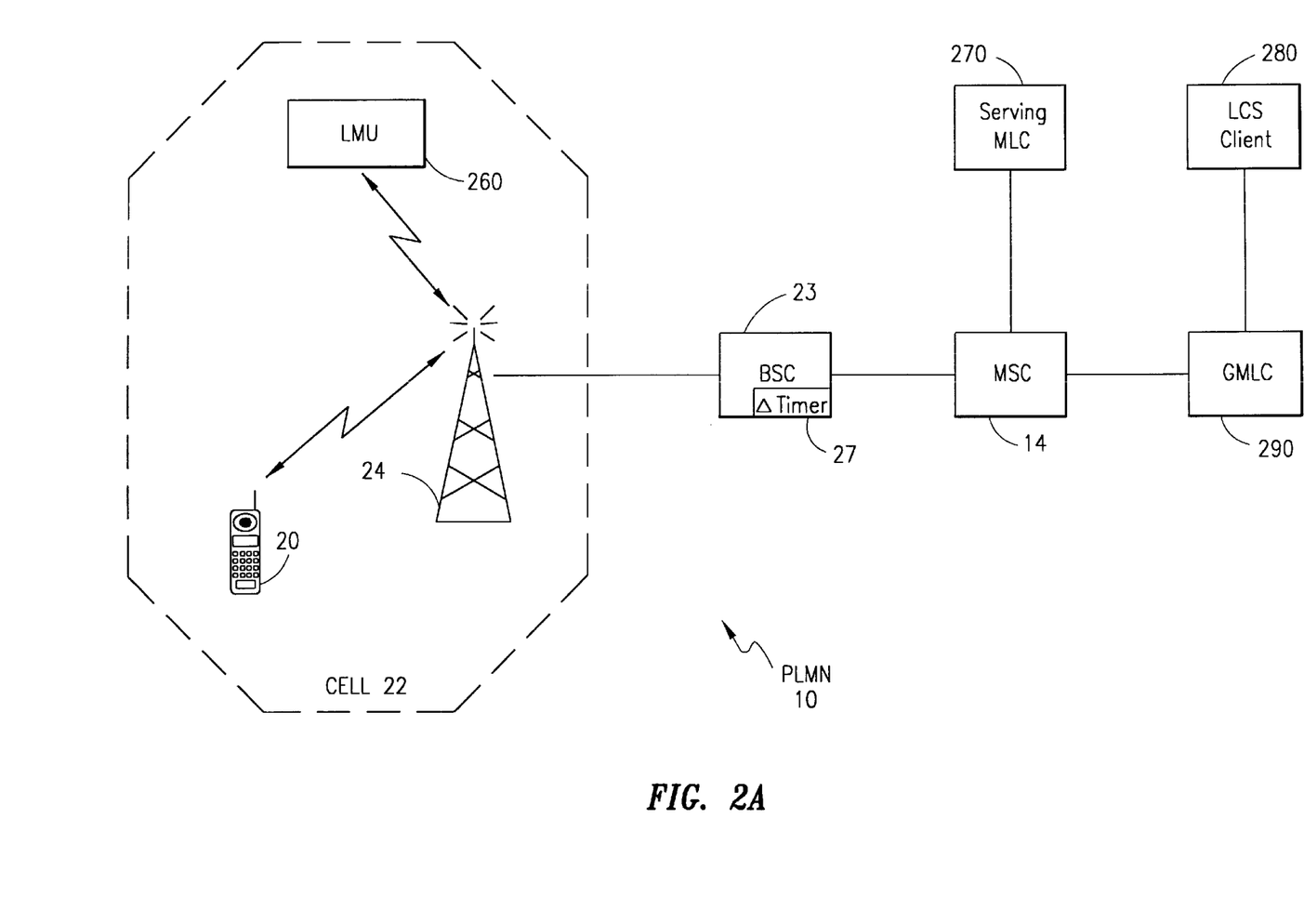
FIG. 2A illustrates a positioning of a mobile station within a cellular network.
Figure 2B:
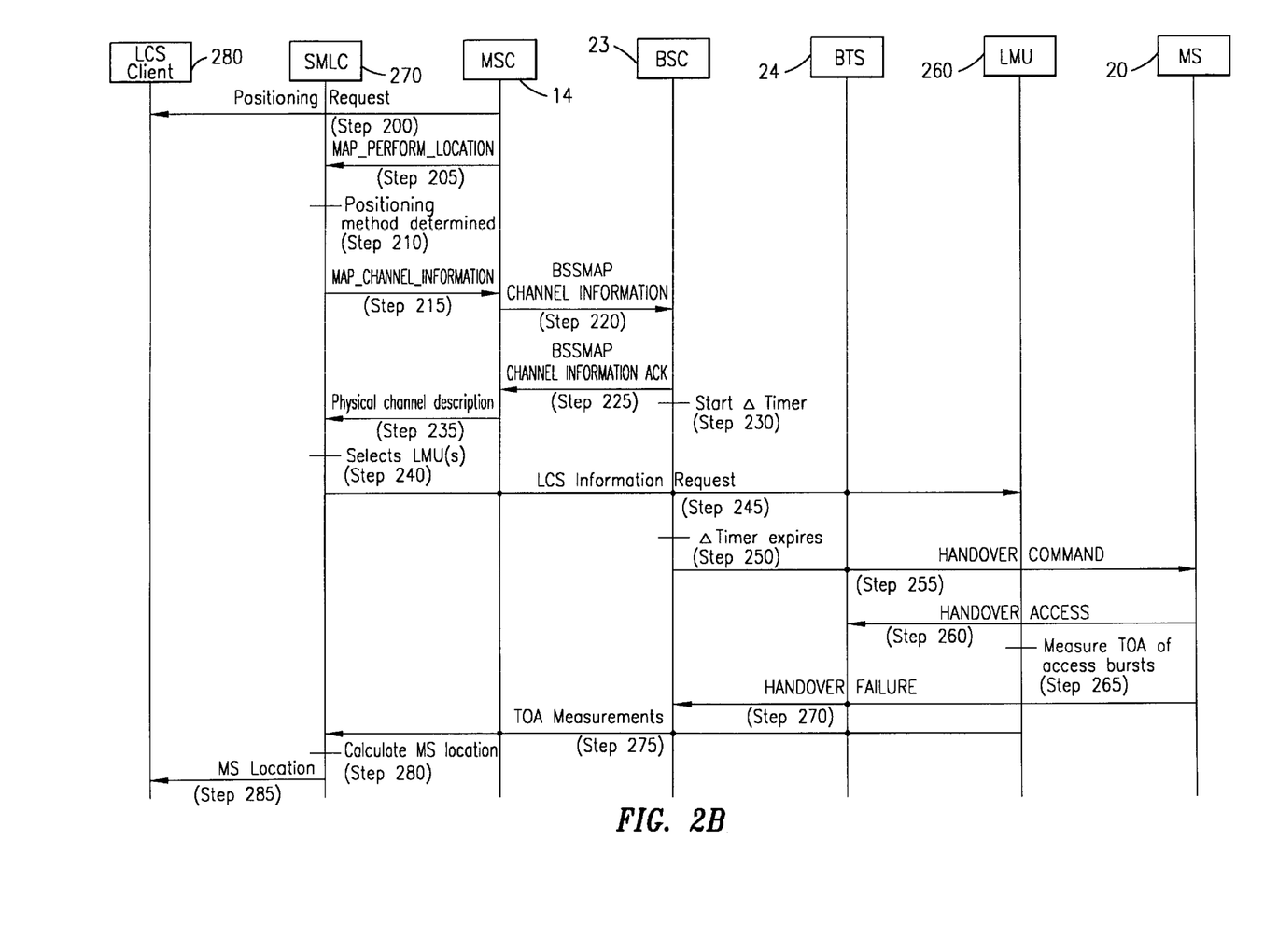
FIG. 2B is a signaling diagram illustrating the steps for positioning the mobile station using a Time of Arrival based positioning method.

As can be seen in FIG. 2A, which will be described in connection with the signaling diagram in FIG. 2B of the drawings, upon the reception of a positioning request from a Location Services (LCS) client (step 200), the MSC 14 sends a MAP_PERFORM_LOCATION message to a Serving Mobile Location Center (SMLC) 270 within the PLMN 10 associated with the MSC 14 (step 205). The SMLC 270 is responsible for carrying out the positioning request and calculating the MS 20 location. It should be noted that more than one SMLC 270 may be located within each PLMN 10. Thereafter, the SMLC 270 determines the positioning method to use (step 210), and if the Time of Arrival (TOA) positioning method is selected, the SMLC 270 returns a MAP CHANNEL INFORMATION message to the MSC 14 (step 215). The MSC 14, in turn, forwards a BSSMAP CHANNEL INFORMATION message to the serving BSC 23, requesting the physical channel description of the traffic channel that will be used to perform a positioning handover (step 220). The message also includes information on the cell 22 ID's and TDMA frame numbers for the serving and candidate cells 22 to which positioning handovers are to be performed to, along with a value for a delta timer 27.

In response, the BSC 23 sends a BSSMAP CHANNEL INFORMATION ACK message to the MSC 14, which includes the requested physical channel description (step 225). In addition, the BSC 23 starts the delta timer 27 (step 230). The MSC 14 forwards this physical channel description received from the BSC 23 to the SMLC 270 (step 235), which uses this physical channel description to configure at least three Location Measurement Units (LMUs) 260 (only one of which is shown) within the PLMN 10. The LMUs 260 are responsible for obtaining positioning measurements and providing these measurements to the SMLC 270 for use in calculating the location of the MS 20. All communication to and from the LMUs 260 are sent over the air interface. Therefore, each LMU 260 is in wireless communication with an associated BTS 24. The SMLC 270 selects which LMUs 260 should obtain the positioning measurements (step 240), and sends LCS Information Request messages to each of these selected LMUs 260 (step 245).

At the expiration of the delta timer 27 within the BSC 23 (step 250), the BSC 23 begins the positioning handover process. The delta timer 27 is used to ensure that the SMLC 270 has enough time to configure the LMUs 260 prior to initiating the positioning handover process. A positioning handover occurs when the BSC 23 sends a HANDOVER (HO) COMMAND message to the MS 20 (step 255), instructing the MS 20 to perform a handover to the serving BTS 24 or a target BTS (not shown) on a specified channel. The HO COMMAND message also indicates the TDMA frame number that the MS 20 should begin sending access bursts. When the MS 20 starts sending the access bursts in a HANDOVER ACCESS message (step 260), the configured LMUs 260 measure the Time of Arrival (TA) of these access bursts (step 265). Since the handover is a positioning handover, and not a radio-related handover, the BTS 24 will not respond to the HANDOVER ACCESS message, and the MS 20 will stop sending the access bursts upon the expiration of a timer (not shown) within the MS 20. Thereafter, the MS 20 returns to the old channel that it was assigned to, and sends a HANDOVER FAILURE message to the BSC 23 (step 270).

These TOA measurements are forwarded from the LMUs 260 to the SMLC 270 (step 275) for use in assisting the calculation of the geographical location of the MS 20 (step 280). After the SMLC 270 calculates the MS 20 location (step 280), this location is transmitted to the LCS client 280 that requested the positioning (step 285). It should be noted that the requesting client 280 could be located within the MS 20 itself, within the MSC 14 or could be an external node, such as an Intelligent Network (IN) node. If the client 280 is not within the MS 20 or within the MSC 14, the location information is sent to the requesting client 280 via the MSC 14 and a Gateway Mobile Location Center (GMLC) 290.

However, if a radio-related handover is initiated before the expiration of the delta timer 27, in today's architecture, the BSC 23 cancels the ongoing positioning, and notifies the MSC 14 of the cancellation of the TOA request. A radio-related handover may occur if the MS 20 is involved in a call connection, and roams into the coverage area of a new cell 22. In order to continue the call, the call must be handed over to the new cell 22. This handover process may take several seconds, which could cause the MS 20 to start transmitting the access bursts for the positioning handover in the wrong TDMA frame number. Since the LMUs 260 are listening at the time associated with the same TDMA frame number that was sent to the BSC 23 in the BSSMAP CHANNEL INFORMATION message, the LMUs 260 will not be listening to the access bursts sent by the MS 20. Therefore, in order to avoid this situation, the BSC 23 cancels the positioning. This could potentially delay the positioning process anywhere from three to five seconds, which may be undesirable for many LCS clients 280.

SUMMARY OF THE INVENTION

The present invention is directed to telecommunications systems and methods for allowing an ongoing Time of Arrival (TOA) based positioning of a mobile station to proceed even if a radio-related handover has occurred before the expiration of a delta timer in a Base Station Controller (BSC). The BSC stores an HOTIMER value therein, which corresponds to the amount of time involved in a normal radio-related handover procedure from the sending of a Handover Command to the reception of a Handover Complete message. If the BSC delta timer is active, e.g., positioning is ongoing, and the BSC determines that a radio-related handover is needed, the BSC checks the amount of time remaining in the BSC delta timer. If that amount is more than the HOTIMER, then the ongoing positioning is not canceled.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
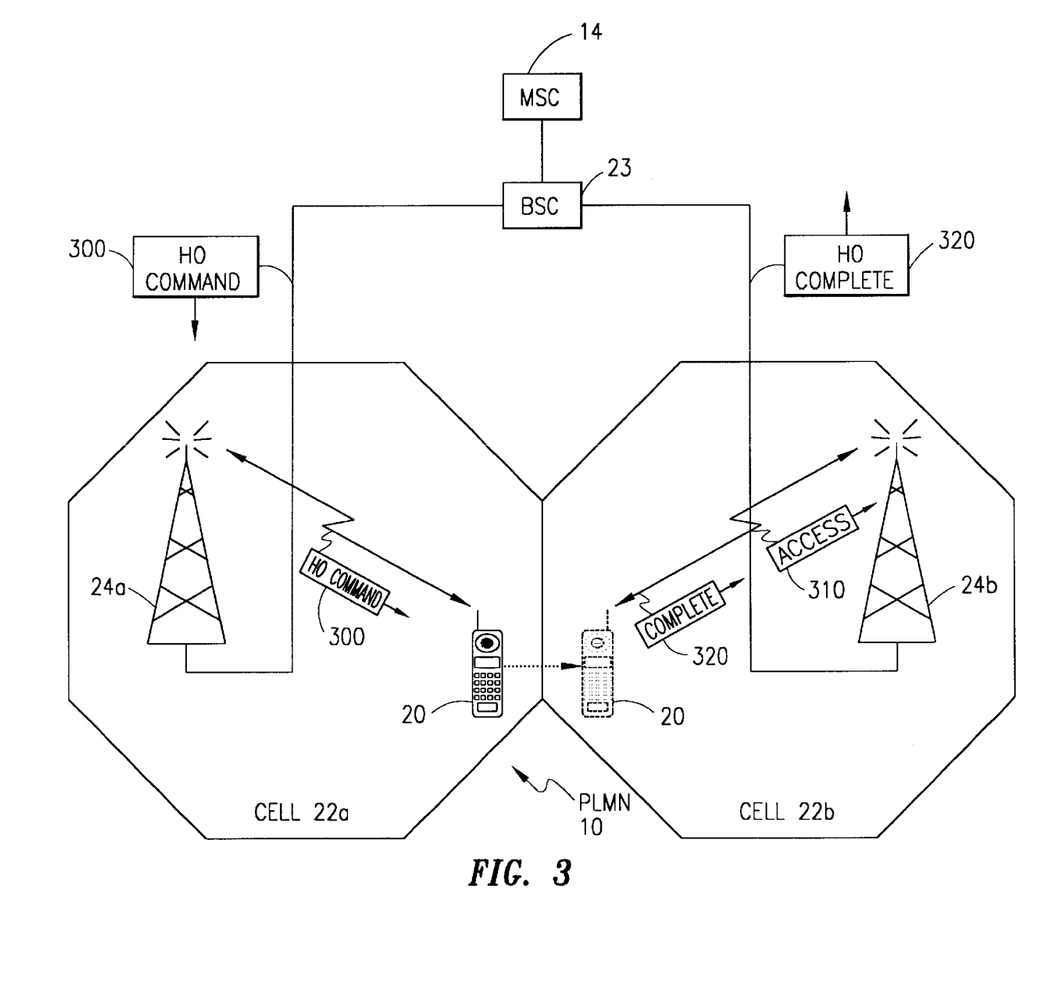
FIG. 3 illustrates a handover of a mobile station between two cells.

The process of changing cells during a call within a cellular network is generally referred to as a handover. With reference now to FIG. 3 of the drawings, when a Mobile Station (MS) 20 involved in a call connection roams from a serving cell 22a into a target cell 22b, a handover of the call must be performed to the target cell 22b. Both the MS 20 and a serving Base Transceiver Station (BTS) 24a associated with the serving cell 22a transmit signal strength measurements to a serving Base Station Controller (BSC) 23. Based upon these measurements, the BSC 23 decides that a handover to the target cell 22b needs to be performed.

To initiate the handover, the BSC 23 sends a HANDOVER COMMAND message 300 to the MS 20 via the serving BTS 24a containing information concerning the frequency and time slot to change to. Thereafter, the MS 20 tunes to the new frequency and transmits a HANDOVER (HO) ACCESS message 310 containing access bursts in the new time slot. When the target BTS 24b detects the access bursts, the target BTS 24b transmits information to the MS 20 relating to the Timing Advance (TA), or the amount of time in advance that the MS 20 must transmit a signal in order for that signal to be received by the target BTS 24b in the correct time slot. Upon reception of the TA information, the MS 20 sends a HANDOVER COMPLETE message 320 to the BSC 23 via the new target BTS 24b.

If the serving and target cells 22a and 22b, respectively, are associated with different BSCs 23 or different Mobile Switching Centers (MSCs) 14, the process is more complicated. However, the basic transfer procedure described above is the same. In any case, such handover processes may take several seconds to complete, and during this time, the MS 20 is not able to engage in any other activities, such as sending or receiving Short Message Service (SMS) messages or performing a positioning handover.

Figure 4:
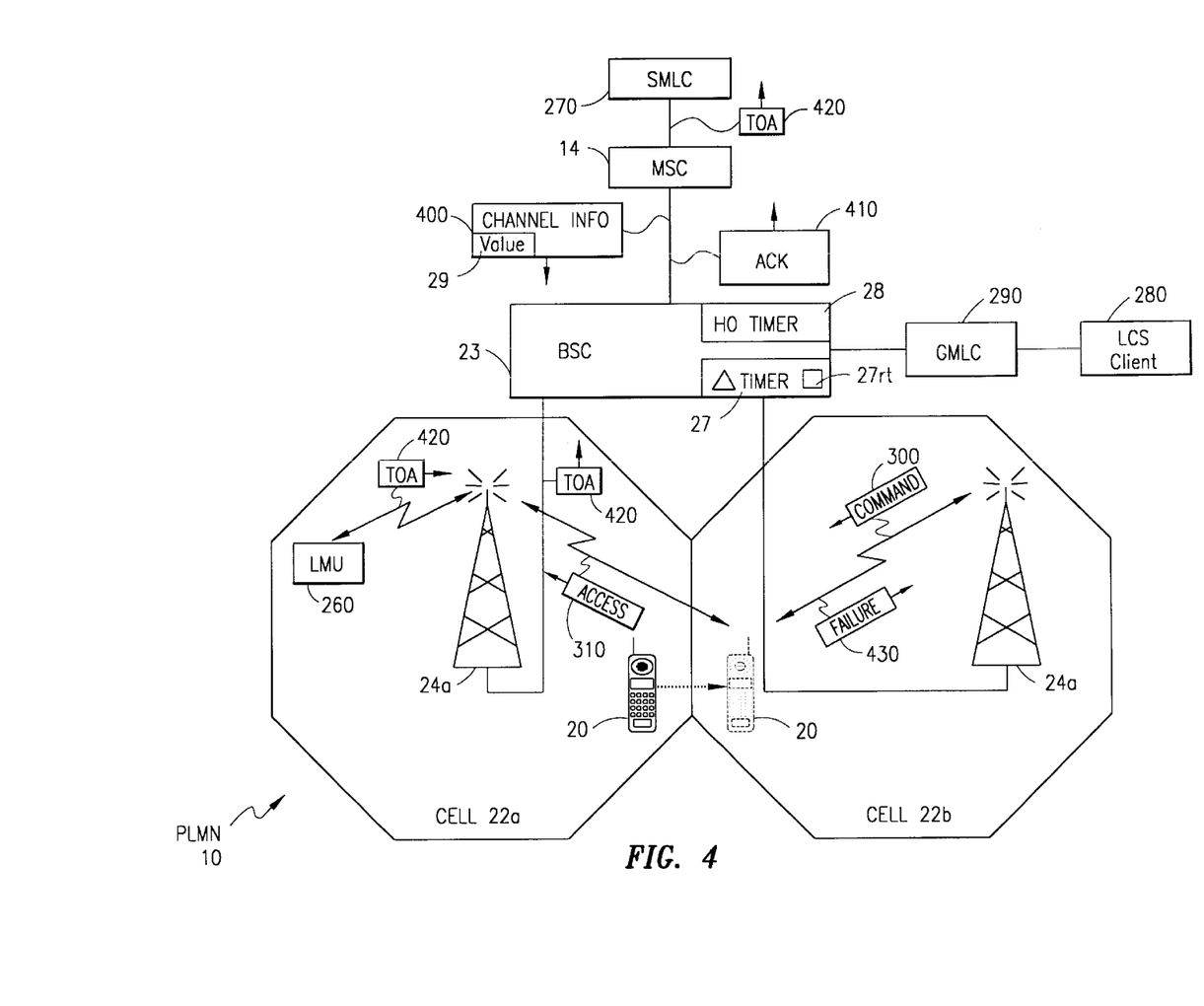
FIG. 4 illustrates a handover during an ongoing positioning process, in accordance with preferred embodiments of the present invention.
Figure 5:
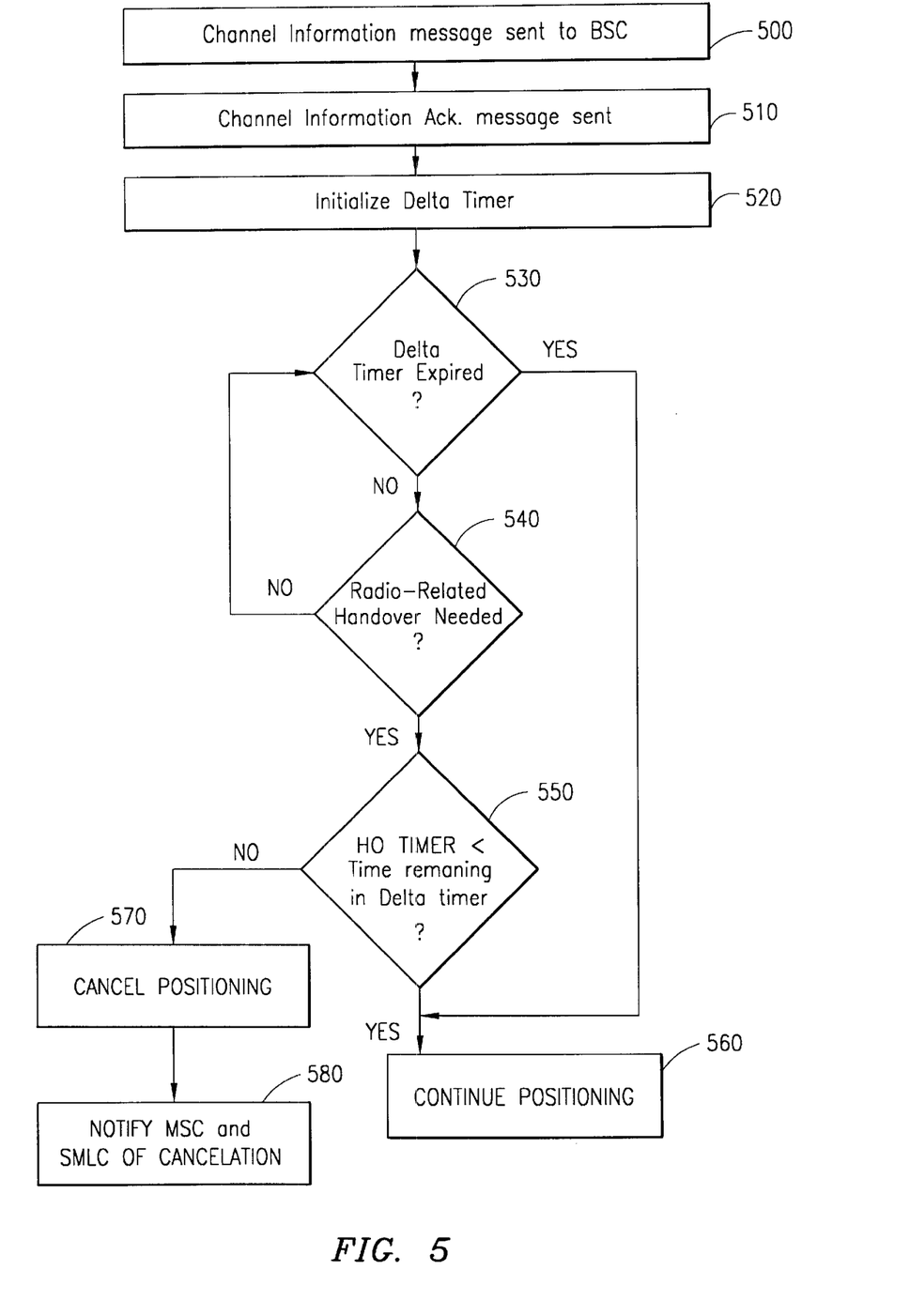
FIG. 5 illustrates the steps for performing the handover during the ongoing positioning process, in accordance with preferred embodiments of the present invention.

Therefore, in accordance with embodiments of the present invention, reference is now made to FIG. 4 of the drawings, which will be described in connection with the steps illustrated in FIG. 5 of the drawings. In order to allow an ongoing Time of Arrival (TOA) based positioning process to continue even when a radio-related handover is performed, a Handover Timer (HOTIMER) 29 can be stored within the BSC 23 to provide an accurate measurement of the maximum amount of time required to perform a radio-related handover within the PLMN 10 that the BSC 23 is associated with.

When the MSC 14 receives the MAP CHANNEL INFORMATION message from the SMLC 270, the MSC 14 forwards the information in this message to the BSC 23 in the BSSMAP CHANNEL INFORMATION message 400 (step 500). The information contained in this message includes a value 29 for the BSC delta timer 27, the maximum call setup time, and an indication of the preferred positioning handover type, such as intra-cell to the same channel, intra-cell to a new channel or inter-cell. In addition, the message also contains the cell ID and TDMA frame number of the serving cell 22a and/or the cell ID and TDMA frame number for candidate cells, such as cell 22b, for positioning handovers.

The BSSMAP CHANNEL INFORMATION message 400 further requests the physical channel description for the traffic channel that the BSC 23 will assign to perform the positioning handover on, taking into consideration the preferred positioning handover type. The BSC 23 includes this physical channel information, such as the frequency, hopping sequence, channel type and time slot for access bursts, in the acknowledgment message 410 to the MSC 14, which, in turn, forwards this information to the SMLC 270 (step 510). At substantially the same time that the BSC 23 transmits the acknowledgment message 410, the BSC 23 starts the delta timer 27 with the delta timer value 29 included in the BSSMAP CHANNEL INFORMATION message 400 (step 520).

During the delta timer 27 time period, the SMLC 270 selects and configures Location Measurement Units (LMUs) 260 (only one of which is shown) that measure the time of arrival (TOA) of access bursts transmitted by the MS 20 during an asynchronous positioning handover. The configuration process involves the SMLC 270 transmitting an LCS Information Request message to each selected LMU 260 via the MSC 14, BSC 23 and BTS 24 over the air interface. Each LCS Information Request message is targeted to one LMU 260, and specifies the radio frequency list, hopping sequence information, HO reference number, BSIC, starting time, measurement options, start time uncertainty and GPS time stamping request.

If, before the BSC 23 delta timer expires (step 530) (before a positioning handover has been initiated), the BSC 23 determines that a normal (radio-related) handover from the serving cell 22a to a target cell 22b needs to be performed due to prevailing radio conditions (step 540), the BSC 23 checks a remaining amount of time $27_{rt}$ in the BSC 23 delta timer 27. If the time remaining $27_{rt}$ in the delta timer 27 is greater than the HOTIMER value 28 (step 550), the BSC 23 will not cancel the ongoing positioning (step 560). Otherwise, the BSC 23 cancels the ongoing positioning (step 570), and notifies the MSC 14 and SMLC 270 of the cancellation of the TOA positioning request (step 580).

Since the radio-related handover process takes a certain period of time to carry out, represented by the HOTIMER value 28, and the MS 20 may not engage in any other activities during this time, if the radio-related handover is still ongoing when the delta timer 27 expires, the MS 20 may not receive the HANDOVER (HO) COMMAND message 300 from the BSC 23 in time to transmit the access bursts for the positioning handover in the designated TDMA frame number. Even if the MS 20 were to transmit the access bursts in a later TDMA frame number, the LMUs 260 will be listening for these access bursts at the time associated with the designated TDMA frame number, not the later TDMA frame number. Therefore, the LMUs 260 will not receive any access bursts from the MS 20, and thus, the IMUs will not produce any TOA measurements 420.

However, as long as the radio-related handover can be completed prior to the expiration of the delta timer 27, the BSC 23 will be able to transmit the HO COMMAND message 300 to the MS 20 in time for the MS 20 to perform an asynchronous positioning handover in the designated TDMA frame number. It should be noted that after the radio-related handover from an old channel to a new channel, if the positioning handover is an intra-cell handover on the old channel, the BSC 23 cannot reallocate the old channel until after positioning has been completed.

When the BSC 23 sends the HO COMMAND message 300 to the MS 20, the HO COMMAND message 300 instructs the MS 20 to perform a handover to the serving BTS (now BTS 24b) or a target BTS (such as BTS 24a) on a specified channels the latter being shown. The HO COMMAND message 300 also indicates the TDMA frame number that the MS 20 should begin sending access bursts. When the MS 20 starts sending the access bursts in a HANDOVER ACCESS message 310, the configured LMUs 260 measure the Time of Arrival (TA) of these access bursts. Since the handover is a positioning handover, and not a radio-related handover, the BTS 24b will not respond to the HANDOVER ACCESS message 310, and the MS 20 will stop sending the access bursts upon the expiration of a timer within the MS 20. Thereafter, the MS 20 returns to the old channel that it was assigned to, and sends a HANDOVER FAILURE message 430 to the BSC 23 via the serving BTS 24b.

These TOA measurements 420 are forwarded from the LMUs 260 to the SMLC 270 for use in assisting the calculation of the geographical location of the MS 20. After the SMLC 270 calculates the MS 20 location, this location is transmitted to the LCS client 280 that requested the positioning. If the client 280 is not within the MS 20 or within the MSC 14, the location information is sent to the requesting client 280 via the MSC 14 and a Gateway Mobile Location Center (GMLC) 290.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for performing a radio-related handover during an ongoing time of arrival based positioning of a mobile station within a cellular network, comprising:
   a base station controller in wireless communication with said mobile station, said base station controller receiving a message associated with said ongoing time of arrival based positioning and determining that said radio-related handover needs to be performed after reception of said message;
   a timer within said base station controller, said timer being initiated substantially upon receipt of said message; and a handover value within said base station controller for indicating the amount of time needed to perform said radio-related handover, said base station controller comparing a remaining amount of time in said timer with said handover value and continuing said ongoing positioning when said handover value is less than said remaining amount of time.

2. The telecommunications system of claim 1, wherein said message is a BSSMAP CHANNEL INFORMATION message.

3. The telecommunications system of claim 1, further comprising:

a mobile switching center connected to said base station controller for sending said message to said base station controller.

4. The telecommunications system of claim 3, wherein, in response to said message, said base station controller transmits an acknowledgment message to said mobile switching center, said timer being initiated at substantially the same time as the transmission of said acknowledgment message.

5. The telecommunications system of claim 4, further comprising:

a serving mobile location center connected to said mobile switching center for originating said message and receiving said acknowledgment message from said base station controller via said mobile switching center.

6. The telecommunications system of claim 5, further comprising:

at least one location measurement unit in wireless communication with said base station controller for obtaining measurements associated with the time of arrival of access bursts transmitted from said mobile station during said ongoing positioning.

7. The telecommunications system of claim 6, wherein said serving mobile location center configures said at least one location measurement unit upon receipt of said acknowledgment message and calculates the location of said mobile station within said cellular network using said measurements.

8. The telecommunications system of claim 1, wherein said message includes a timer value for said timer, said timer being initiated with said timer value.

9. The telecommunications system of claim 1, wherein said base station controller cancels said ongoing positioning when said handover value is greater than said remaining amount of time.

10. A method for determining whether an ongoing positioning of a mobile station within a cellular network should be continued upon initiation of a radio-related handover of said mobile station, comprising the steps of:

initiating a timer associated with said ongoing positioning of said mobile station;

determining that said radio-related handover needs to be performed;

comparing a remaining amount of time of said timer with a predetermined handover value that indicates the amount of time needed to perform said radio-related handover;

if said predetermined handover value is less than said remaining amount of time, continuing said ongoing positioning;

otherwise, canceling said ongoing positioning.

11. The method of claim 10, further comprising the step of:

receiving a message having a timer value therein, said step of initiating being performed using said timer value.

12. The method of claim 10, wherein said step of receiving further comprises the step of:

sending said message from a mobile switching center to a base station controller in wireless communication with said mobile station.

13. The method of claim 12, further comprising the step of:

in response to said message, transmitting an acknowledgment message from said base station controller to said mobile switching center, said step of initiating said timer being performed at substantially the same time as said step of transmitting.

14. The method of claim 13, wherein said step of receiving further comprises the step of:

sending said message from a serving mobile location center to said mobile switching center.

15. The method of claim 14, wherein said step of transmitting further comprises the step of:

receiving, by said serving mobile location center, said acknowledgment message from said base station controller via said mobile switching center.

16. The method of claim 15, wherein said step of continuing further comprises the step of:

obtaining, by at least one location measurement unit in wireless communication with said base station controller, measurements associated with the time of arrival of access bursts transmitted from said mobile station during said ongoing positioning.

* * * * *

UNITED STATES PATENT AND TRADEMARK OFFICE
CERTIFICATE OF CORRECTION

PATENT NO. : 6,366,781 B1
DATED : April 2, 2002
INVENTOR(S) : Tahir Hussain et al.

It is certified that error appears in the above-identified patent and that said Letters Patent is hereby corrected as shown below:

Column 6,
Line 11, replace "IMUs" with -- LMUs --

Signed and Sealed this

Twentieth Day of August, 2002

Attest:

JAMES E. ROGAN
Attesting Officer    Director of the United States Patent and Trademark Office